United States Patent [19]

Slone

[11] Patent Number: 5,693,300
[45] Date of Patent: Dec. 2, 1997

[54] PROCESS AND APPARATUS FOR REMOVING $NO_x$ FROM GAS STREAMS

[75] Inventor: Ralph J. Slone, Columbus, Ind.

[73] Assignee: Noxtech, Inc., Irvine, Calif.

[21] Appl. No.: 166,253

[22] Filed: Dec. 13, 1993

Related U.S. Application Data

[63] Continuation of Ser. No. 746,963, Aug. 19, 1991, abandoned, which is a continuation of Ser. No. 582,477, Sep. 14, 1990, abandoned.

[51] Int. Cl.$^6$ .................................................. C01B 21/00
[52] U.S. Cl. ........................................ 423/235; 423/239.1
[58] Field of Search .................................. 423/239.1, 235

[56] References Cited

U.S. PATENT DOCUMENTS

| | | | |
|---|---|---|---|
| 3,914,390 | 10/1975 | Kudo et al. | 423/239.1 |
| 4,372,933 | 2/1983 | Kyung et al. | 423/369 |
| 4,851,201 | 7/1989 | Heap et al. | 423/235 |
| 4,908,193 | 3/1990 | Perry | 423/253 |
| 5,020,457 | 6/1991 | Mathur et al. | 110/345 |
| 5,087,431 | 2/1992 | Gardner-Chavis et al. | 423/239.1 |
| 5,137,703 | 8/1992 | Lichtin et al. | 423/239.1 |
| 5,171,558 | 12/1992 | Gardner-Chavis et al. | 423/365 |
| 5,234,670 | 8/1993 | Gardner-Chavis et al. | 423/253 |
| 5,240,688 | 8/1993 | Von Harpe et al. | 423/235 |

OTHER PUBLICATIONS

Caton et al., "Comparison of Nitric Oxide Removal by Cyanuric Acid and by Ammonia", Nov. 1988, p. 12.

*Primary Examiner*—Gary P. Straub
*Assistant Examiner*—Thomas G. Dunn, Jr.
*Attorney, Agent, or Firm*—Woodard, Emhardt, Naughton, Moriarty & McNett

[57] ABSTRACT

Process and apparatus for reducing the $NO_x$ content of a gas stream containing $NO_x$ by reacting the gas stream with activated species. The activated species may be produced by providing a fluid reactant selected from HNCO, $NH_3$, and $H_2NNH_2$ and passing the fluid reactant across a catalyst. The activated species are believed to include free radicals selected from the group consisting of ●NCO, ●$NH_2$, ●NH, ●H, ●N, ●OH, ●NC, and mixtures thereof. The activation step takes place out of contact with the gas stream, so the catalyst or other activated species generator is not exposed to the gas stream. The activation step allows the contacting step and subsequent reaction of the activated species and the $NO_x$ to proceed more quickly, more completely, or at a lower temperature than would otherwise occur without the activation step.

3 Claims, 2 Drawing Sheets

5,693,300

1

PROCESS AND APPARATUS FOR REMOVING NO$_x$ FROM GAS STREAMS

This application is a continuation of application Ser. No. 07/746,963, filed Aug. 19, 1991, now abandoned, which is a continuation of application Ser. No. 07/582,477, filed Sep. 14, 1990, abandoned.

FIELD OF INVENTION

The present invention relates to processes and apparatus for removing NO$_x$ from gas streams, such as exhausts, by reaction of the NO$_x$ with activated species generated outside the gas stream. More environmentally acceptable species such as nitrogen, water vapor, and the like are produced as a result.

BACKGROUND OF THE INVENTION

Recent emphasis on ecological concerns in the enforcement has spawned many efforts to solve the world's air pollution problems. Two major concerns worth noting are acid rain and photochemical smog. While many compounds contribute to these problems, NO$_x$ plays an important role, imposing a significant threat to the environment and human health.

NO$_x$ is a family of compounds of nitrogen and oxygen, primarily, NO and NO$_2$. NO$_x$ comes from a variety of sources, most notably cars, trucks and industrial plants. Specifically, NO$_x$ is produced by high temperature combustion systems, metal cleaning processes, and the production of fertilizers, explosives, nitric acid, and sulfuric acid. In many urban environments, automobiles and diesel engine trucks are the major sources of NO$_x$.

NO is the stable oxide of nitrogen at combustion temperatures. Hence, it is more abundantly produced than NO$_2$. However, at atmospheric conditions, the equilibrium between NO and NO$_2$ favors NO$_2$. Therefore, the effective control of NO$_x$ concerns both the control and removal of both NO and NO$_2$ from exhaust gas streams.

Many attempts have been made to control the generation or release of NO$_x$. Many known strategies involve the control of combustion conditions. This can be accomplished by reducing the temperature and reducing the amount of oxygen present during the combustion process. Another strategy is a reburning process. In this process, NO$_x$ compounds are incinerated in a secondary combustion zone, using fuels which do not contain nitrogen. Another strategy is removal of NO$_x$ from the post-combustion gas or exhaust stream.

Several ways to remove NO$_x$ downstream from the combustion process are known. Once such strategy is a scrubbing technique which takes advantage of the fact that NO$_2$ combines with water to form nitric acid. Nitric acid reacts with ammonia to yield the stable product ammonium nitrate. However, known scrubbing techniques do not remove NO. To overcome this obstacle, those skilled in the art have sought to oxidize NO to NO$_2$ and then apply the aqueous scrubbing process to remove the NO$_2$. NO can be oxidized to NO$_2$ using various organic compounds, such as aldehydes, alcohols, ketones, or organic acids in the presence of oxygen. However, the use and disposal of organic solvents presents a problem, and the process is relatively inefficient.

Another strategy for removing NO$_x$ from gas streams is the reduction of NO$_x$ to nitrogen and water. The prior art teaches catalytic and non-catalytic processes. In the non-catalytic processes, high temperatures are required. In the catalytic processes, problems are encountered when exposing the catalyst to the exhaust gas stream. The catalyst is subject to fouling, poisoning, and disintegration. These shortcomings make the catalytic processes taught by the prior art expensive, unreliable, and potentially hazardous.

Recently, a non-catalytic method of NO$_x$ reduction involving exposure of a gas stream containing NO$_x$ to HNCO has been disclosed. HNCO, also known as isocyanic acid, is an unstable gas at ordinary temperatures and pressures, and thus is hard to handle and store. This problem has been addressed by generating HNCO from stabler, less toxic materials as it is used. One such material is cyanuric acid. Cyanuric acid decomposes when heated, forming HNCO. The HNCO is then injected into the gas stream where the NO$_x$ reduction reaction takes place, providing the temperature is high enough to allow the reaction to proceed. The conversion of cyanuric acid to HNCO and the NO$_x$ reduction take place at relatively high temperatures, such as 1200° to 2600° F. (649° to 1427° C.).

The cyanuric acid process has been modified by carrying out the NO$_x$ reduction in the presence of carbon monoxide (CO). However, this process still operates at relatively high temperatures, such as 932° to 1472° F. (500° C. to 800° C.), and often requires the use of a catalyst in the NO$_x$-laden gas stream. Such high temperatures exceed the temperature of a diesel exhaust gas stream under some conditions of operation. Either intermittent performance must be tolerated or the exhaust stream must be heated to maintain a high temperature.

SUMMARY OF THE INVENTION

The invention is an improved process and apparatus for removing NO$_2$ from a gas stream by reaction of the gas stream with activated species generated outside the gas stream and then contacted with the gas stream. The necessary activated species are contemplated to include free radicals selected from the group consisting of ●NCO, ●NH$_2$, ●NH, ●H, ●N, ●OH, ●NC, and mixtures thereof. Activated species may be generated, for example, by contacting a fluid reactant selected from HNCO, NH$_3$, H$_2$NNH$_2$, or their mixtures with a catalyst bed. By contacting a gas stream containing NO$_x$ with activated species, as opposed to an unactivated fluid reactant, a lower reaction temperature can be used. Also, the catalyst or other generator of activated species is kept separate from the NO$_x$-containing gas stream, thereby providing longer catalyst life, safer operation and lower operating costs.

The amount of fluid reactant fed to the catalyst bed in the preferred process can be controlled in relation to the NO$_x$ content of the gas stream to operate the process efficiently and avoid releasing an excess of the fluid reactant with the treated gas stream.

The process and apparatus disclosed are not limited to automobiles and trucks, and are suitable for reduction of NO$_x$ in other gas streams containing NO$_x$. Therefore, the present invention is useful both for vehicles and for industrial uses.

DETAILED DESCRIPTION OF THE INVENTION

While the invention will be described in connection with certain preferred embodiments, it will be understood that the invention is not limited to those embodiments. On the contrary, the invention comprehends all alternatives, modification, and equivalents as may be included within the spirit and scope of the invention as defined by the appended claims.

Figure 1:
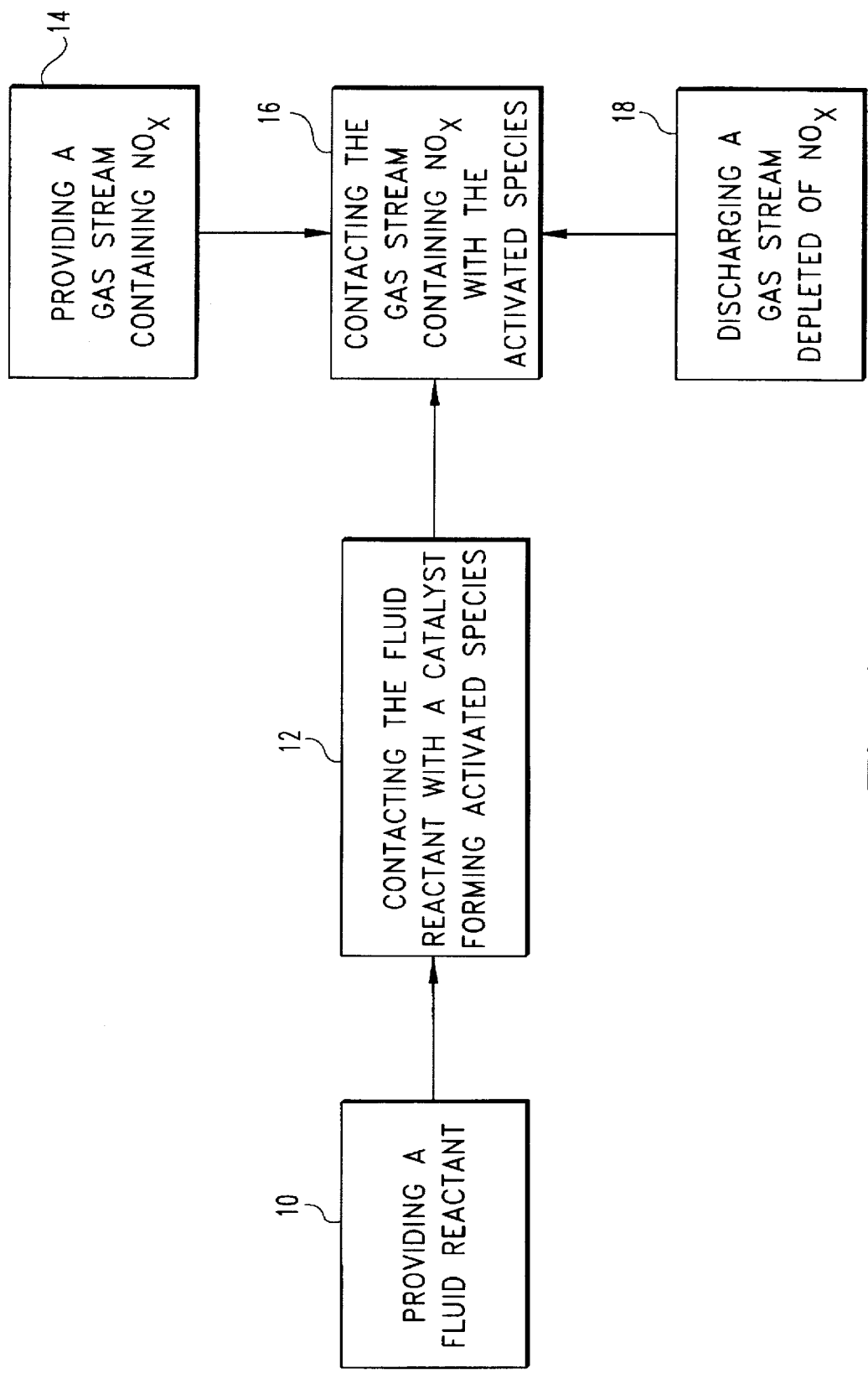
FIG. 1 is a flow diagram of the NO$_x$ reduction process the present invention.

Turning to FIG. 1 of the drawings, the preferred process has three steps. In the first step 10, a fluid reactant is provided, which may be HNCO, NH$_3$, H$_2$NNH$_2$, mixtures thereof, or other fluid reactants. ("Fluid reactants" is defined herein to include gaseous reactants and liquid reactants. Gaseous reactants are specifically contemplated for use herein.) In the next step 12, the fluid reactant provided in the step 10 is contacted with a catalyst for formation of activated species. In a concurrent step 14, a gas stream containing NO$_x$ requiring treatment is provided. In the next step 16, the activated species produced in the step 12 are contacted with the gas stream provided in the step 14. In a subsequent step 18 the gas stream resulting from the step 16, which is at least partially depleted of NO$_2$ by reaction with activated species, is discharged. The activated species can also be provided by other means than the specific catalytic step disclosed here, within the scope of the present invention.

Referring to the step 10, HNCO can be provided by heating precursor materials which decompose to form HNCO. These precursors include, but are not limited to, urea, isocyanuric acid, cyanuric acid, annelide, anneline, hydrazine, and mixtures thereof. Urea is preferred because it is stable and inexpensive. Urea breaks down when heated to form HNCO and NH$_3$, thus providing both reactants as a mixture.

HNCO can also be generated remotely or before it is used and absorbed on a substrate capable of releasably holding a substantial quantity of HNCO on its surface. The substrate is heated to release the HNCO.

One category of substrates contemplated herein is ion exchange resins. An exemplary anionic exchange resin is a dimethylamine-functionalized chloromethylated copolymer of styrene and divinylbenzene. This resin is sold under the trade name DOWEX MWA-1 by Dow Chemical USA, an operating unit of The Dow Chemical Co., Midland, Mich. (DOWEX is a registered trademark.) Another exemplary anionic exchange resin is a trimethylamine functionalized chloromethylated copolymer of styrene and divinylbenzene in the hydroxide form, sold under the trade name DOWEX SBR by Dow Chemical USA. An exemplary cationic exchange resin is a sulfonated copolymer of styrene and divinylbenzene in the sodium form, sold under the trade name DOWEX HCR by Dow Chemical USA.

Another category of substrates contemplated herein is a physically absorbent medium, such as a zeolite. Zeolites are classified by their inherent pore sizes. A zeolite useful as a substrate herein is one having pores sized to physically trap HNCO molecules. Once of ordinary skill in the art can readily determine the optimal pore size for a particular type of zeolite (depending on its chemistry, particle size, storage chamber size and shape, etc.) The optimal pore size also depends on whether the substrate is contemplated to function solely as a substrate or also as a catalyst for activating the reactant as it is released (as discussed below). Representative zeolites contemplated for use herein (subject to the necessary optimization) include zeolites with effective pore openings of from about 3 to about 10 angstroms.

A representative zeolite with a three angstrom effective pore size is an alkali aluminosilicate which is the potassium for of the Type A crystal structure, having the chemical formula:

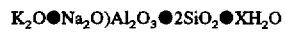

An exemplary commercial zeolite of this type is ZEOCHEM molecular sieve, Type 3A, sold by Zeochem, Louisville, Ky., which is a joint venture of Chimische Fabrik Uetikon and united Catalysts, Inc. (ZEOCHEM is a registered trademark).

A representative zeolite with a four angstrom effective pore size is an alkali aluminosilicate which is the sodium form of the Type A crystal structure, having the chemical formula:

An exemplary commercial zeolite of this type is ZEOCHEM Molecular sieve, Type 4A, sold by Zeochem.

A representative zeolite with a five angstrom effective pore size is an alkali aluminosilicate which is the calcium form of the Type A crystal structure, having the chemical formula:

An exemplary commercial zeolite of this type is ZEOCHEM molecular sieve, Type 5A, sold by Zeochem.

A representative zeolite with a ten angstrom effective pore size is an alkali aluminosilicate which is the sodium form of the Type X crystal structure, having the Chemical formula:

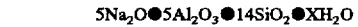

An exemplary commercial zeolite of the type is ZEOCHEM molecular sieve, Type 13X, sold by Zeochem.

Yet another category of substrates contemplated herein is activated charcoal. At least two forms of activated charcoal are contemplated for this invention: activated charcoal treated metallic oxides and high surface area coconut shell derived activated carbon.

Activated charcoal treated metallic oxides can be used to store HNCO and are physically strong, highly absorbent and can be regenerated thermally. Regeneration restores the absorptive properties. An exemplary activated charcoal treated metallic oxide is G-32W sold by United Catalysts, Inc. of Louisville, Ky. G-32W contains CuO (8.0%) and CrO$_3$ (4.5%). G-32W is sold in granular form.

Coconut shell derived activated charcoal can be used to store HNCO and is also be regenerated thermally. An exemplary coconut shell derived activated charcoal is G-32H sold by United Catalysts, Inc. G-32H has a high surface area and comes in granular form.

Yet another category of substrates contemplated herein is that of metallic hydrides made by absorbing atomic hydrogen on high porosity metals selected from precious metals, base metals and mixtures thereof. Precious metals contemplated herein include but are not limited to, palladium. Base metals contemplated herein include, but are not limited to, alloys and mixtures of cobalt, iron, nickel, manganese, titanium, aluminum, and rare earth metals. Three exemplary base metal alloys contemplated herein are an alloy of 50% titanium, 44% iron, and 5% manganese; an alloy of misch metal, nickel, and aluminum; and an alloy of misch metal, nickel, and iron. Misch metal is a mixture of rare earth metals having a melting temperature of about 1198° F. (648° C.), prepared by electrolyzing a fused rare earth chloride mixture.

NH$_3$ or H$_2$NNH$_2$ may also be provided as the sole fluid reactant, within the scope of the present invention. NH$_3$ can be generated as needed or stored in water solution, on a substrate, or in liquid anhydrous form. H$_2$NNH$_2$ may be stored as a liquid and evaporated as needed.

In the step 12, the fluid reactant contacts a catalyst and is converted at least partially into activated species. For the purposes of the present invention, activated species are considered to have been generated in the fluid reactant according to the present invention if the product of the step 12 reacts with NO$_x$ more readily or completely during the step 16, under the same reaction condition, than would the product of the step 10 which has not contacted a catalyst. While the invention is not limited by any particular theory as to the nature of the activated species, they are contemplated to be at least partially free radicals which are stable enough to be transported to and reacted with the gas stream containing NO$_x$.

Most broadly, any free radicals which will react with NO$_x$ to form more desirable products such as nitrogen, carbon dioxide, water, and the like are contemplated for use herein. Representative of the free radicals which may be employed are ●NCO, ●NH$_2$, ●NH, ●H, ●N, ●OH, ●NC, and any other free radicals which may be generated by interaction of HNCO, ammonia, or hydrazine with a catalyst. Ordinary compounds and reaction intermediates other than these starting materials, generated by the action of catalysts or otherwise, are also contemplated to function as activated species herein.

The generation of activated species outside the gas stream is advantageous for several reasons. First, the catalyst or other free radical generator is isolated from the gas stream containing NO$_x$. Thus, the catalyst is less likely to foul, plug, or disintegrate, particularly when the gas stream of the step 14 is an exhaust stream containing carbon particles, tars, carbon oxides, sulfur oxides, etc. Furthermore, this controlled use of a catalyst will provide longer catalyst life. It is also inherently safer. While the catalyst of the preferred process may be used in an oxidizing, reducing, or inert system, the preferred catalysts are tolerant of atmospheric oxygen and will function in the presence of oxygen.

The catalyst and apparatus can be selected and configured to provide a reverse hourly space velocity (RHSV) from about 500 to about 40,000 inverse hours, or alternately from about 2000 to about 10,000 inverse hours. RHSV is given by the equation:

$$RHSV = \frac{\text{(volume of gas exposed to catalyst per hour)}}{\text{(volume of catalyst)}}$$

Catalysts contemplated for use herein can be selected from a wide variety of materials. Those materials include, but are not limited to, gamma alumina ($\gamma$—Al$_2$O$_3$), titania (TiO$_2$), cordierite, magnesia (MgO), zeolites (as previously described), vanadium pentoxide (V$_2$O$_5$), platinum (Pt), palladium (Pd), cerium oxide (CeO), iron oxides, chromium oxides, nickel oxide (NiO) and combinations thereof. These catalysts will generate activated species from the fluid reactant if the correct catalyst compositions and process conditions are employed. One of ordinary skill in the art can modify the selected catalyst by doping with alkali or alkaline earth metals, varying proportions of starting materials, varying catalyst preparation and firing conditions, selecting a carrier material, providing the catalyst in various physical forms, and the like to optimize the catalyst for use in the present invention. It is contemplated that the desirable catalyst pore size and surface characteristics are those which will maximize the number of active sites on the catalyst per unit of catalyst surface area or bulk volume.

For example, a combination of Fe$_2$O$_3$ and Cr$_2$O$_3$ sold under the trade names C12-1, C12-3 and G-3 by United Catalysts is contemplated for use herein. The typical operating temperature range for these catalyst is 650° to 950° F. (343° to 510° C.), and may readily be optimized for the present process by one of ordinary skill in the art- The nominal compositions of the catalyst are Fe$_2$O$_3$ (89%) and Cr$_2$O$_3$ (9%). An exemplary commercial catalyst composed of NiO and Al$_2$O$_3$ is sold under the trade names C11-2, C11-4, and C11-9 by United Catalysts, Inc. An exemplary commercial catalyst composed of Fe$_2$O$_3$ and Al$_2$O$_3$ is sold under the trade name C-47 by United Catalysts, Inc. An exemplary commercial catalyst composed of chromia alumina is G-47 sold by United Catalysts, Inc. An exemplary commercial catalysts composed of platinum is G-47, sold by United Catalyst. G-47 is spherical in shape and has high physical strength and high resistance to thermal shock. An exemplary commercial catalyst composed of V$_2$O$_5$ is C116, sold by United Catalysts, Inc. C116 comes in pellet, ring and ribbed ring forms. The qualities of C116 include high activity and low attrition loss. Another catalyst contemplated for use herein is platinum doped with palladium. This catalyst is readily available and is commonly used in automobile catalytic converters.

Conversion of the fluid reactant to the activated species is expected to be carried out at temperatures from a minimum of 200° F., (about 93° C.) and perhaps even a minimum of ambient atmospheric temperature, to about 1400° F. (about 760° C.). Alternately, moderate temperatures ranging from about 500° to about 1200° F. (260° to 427° C.) can be used. Another temperature range contemplated herein is from about 500° F. to about 800° F. (260° to 427° C.). Another temperature contemplated herein is about 700° F. (371° C.).

The optimal temperature in any particular system can readily be determined by one of ordinary skill in the art. It is contemplated that the optimal temperature will be greater than the temperature at which bonds are broken in he reactant to form free radicals and less than the temperature at which the reactant will react with oxygen in the reactant steam or participate in other undesirable reactions. These temperature ranges are significantly lower than those taught by the prior art. Thus, it is contemplated that the process carried out here is different in kind from the thermal dissociation process in the exhaust stream, employed by the prior art to decompose HNCO. This process difference allows the necessity of exhaust gas heating to be reduced or eliminated without sacrificing performance when the present invention is practiced. A collateral advantage of the present invention is that lower temperatures can be regulated more exactly and easily than the higher temperatures of the prior art.

The pressure of contact with the catalyst can vary from ambient atmospheric pressure or less to about 100 pounds per square inch gauge pressure (about 69 Newtons per cm$^2$) or more. One particular pressure contemplated herein is a pressure as great as or slightly greater than the pressure of the gas stream containing NO$_x$.

The next step in this NO$_x$ reduction process is the gas stream contacting step 16. Here, activated species from the catalyst contacting step 12 are contacted with the gas stream containing NO$_x$ provided in the step 14. The contacting step 16 can be carried out at a temperature between ambient temperature and 1500° F. (about 760° C.) or alternatively at a temperature as high as 1800° F. (about 980° C.). The contacting step can alternately be carried out at other temperatures, namely, from about 500° to about 1200° F. (260° to 649° C.), or from about 500° to about 800° F. (260° to 427° C.), or at about 700° F. (371° C.). The minimum contacting temperature which results in effective conversion of $NO_x$ to more innocuous species is preferred herein. The pressure in the contact zone can be the normal pressure of the gas stream, and preferably is at least as great as ambient atmospheric pressure. The pressure in the contact zone can be as high as 100 psi (69 $N/cm^2$) gauge pressure or more.

An important aspect of the contacting step is the average time to contact, defined herein as the average interval of time between the time an activated species is created and the time the activated species contacts a molecule of $NO_x$ in the exhaust. Since free radicals or other activated species are commonly short-lived, the average time to contact should be minimized. This can be accomplished by generating the activated species and maintaining the gas stream in concentrated form, quickly transporting the activated species to the gas stream containing $NO_x$, mixing the activated species and the gas stream quickly and thoroughly, maintaining the contact between the activated species and the gas stream for as long as is reasonably possible, and by other expedients.

The disclosed process is not limited to use on automobiles and diesel trucks. The process is applicable to gas streams exhausted from almost any combustion engine, incinerator, boiler, or other heat source. The present invention can be used to remove $NO_x$ from smokestack exhaust and oil recovery steamers.

Figure 2:
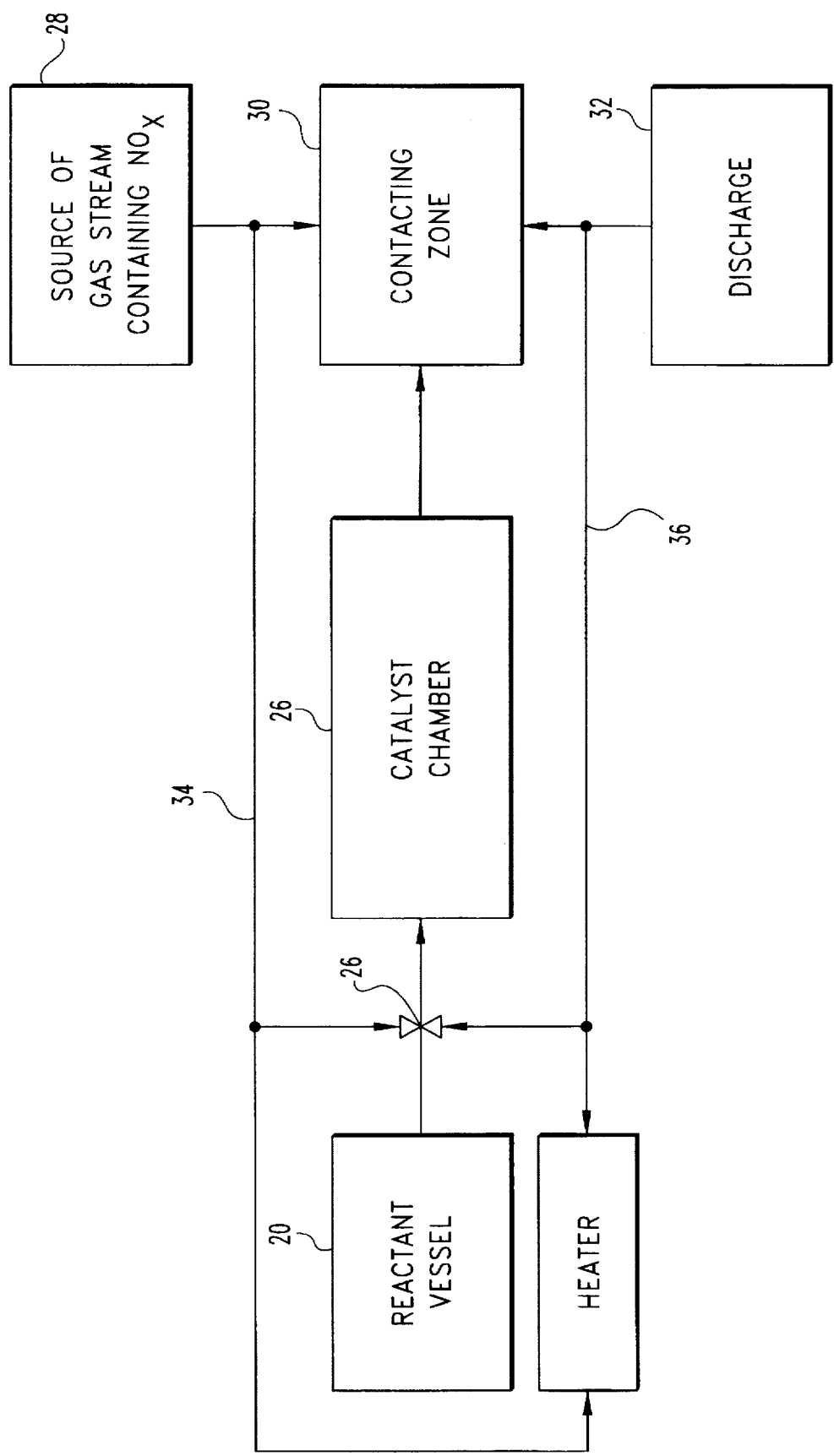
FIG. 2 is a schematic diagram of the NO$_x$ reduction apparatus of the present invention.

Apparatus for carrying out the disclosed process is illustrated schematically in FIG. 2. The apparatus of FIG. 2 generally comprises a reactant vessel 20 for containing a source of the selected fluid reactant, a heater 22 for driving the selected fluid reactant out of the source, a control valve 24 for regulating the output of the reactant vessel 20, a catalyst chamber 26 for contacting the fluid reactant with a catalyst, a source 28 of a gas stream containing $NO_x$, a contacting zone 30 for mixing the effluents of the catalyst chamber 26 and the source 28, and a discharge 32 for the reaction products of the mixing zone 30 and any unreacted feed materials. Each of these parts of the apparatus may be conventional.

The selection of the reactant vessel 20 will depend upon the reactant source material chosen, the manner and form in which the reactant is stored, and the temperature required for the production of the fluid reactant. It will be advantageous to use a reactant vessel which employs both a heater 22 and a control valve 24. The heater 22 can be regulate to control the flow rate and pressure of the fluid reactant delivered to the catalyst chamber 26. The control valve 24 can be employed to further regulated the flow of the fluid reactant to the catalyst chamber 26. The heater 18 and control valve 24 are controlled by a feedback loop such as 34 or 36 (or both) which is responsive to the $NO_x$ content of the gas stream, thereby regulating the flow of fluid reactant to the catalyst chamber 26, and, ultimately, regulating the flow of activated species to be mixed with the gas stream. Thus, the production of the fluid reactant and activated species can be regulated in relation to the $NO_x$ content of the gas stream.

In an alternate embodiment of the invention, the reactant source vessel 20 can be a supply of solid particulate isocyanuric acid epuipped with means responsive to the feedback from one of the loops 34 and 36 for metering the solid acid into a heating chamber where the solid acid is decomposed to form a gaseous isocyanic acid.

Thus, a process and apparatus have been described and illustrated for supplying a fluid reactant; passing the fluid reactant over a catalyst to produce at least enough activated species to provide and improvement in the subsequent contacting step; and contacting and reacting the activated species with a gas stream containing $NO_x$ to reduce the $NO_x$ content thereof. The process and apparatus do not require exposure of the catalyst or other activated species generator to any of the constituents of the gas stream containing $NO_x$.

What is claimed is:

1. A process for reducing the $NO_x$ content in a gas stream containing $NO_x$ comprising the steps of:
    a. providing activated species outside the gas stream containing $NO_x$ by providing a fluid reactant selected from the group consisting of HNCO, $NH_3$, $H_2NNH_2$, and mixtures thereof and contacting said fluid reactant with a catalyst, thereby at least partially converting said fluid reactant into said activated species; and
    b. contacting said activated species with the gas stream containing $NO_x$ in an amount and under conditions effective to reduce the $NO_x$ content of the gas stream by reaction with said activated species;
    wherein said catalyst is selected from the group consisting of $\gamma Al_2O_3$, $TiO_2$, cordierite, MgO, a zeolite, $V_2O_5$, Pt, Pd, CeO, an iron oxide, a chromium oxide, NiO and combinations thereof.

2. The process of claim 1, wherein said catalyst is $\gamma$-$Al_2O_3$.

3. The process of claim 1, wherein said catalyst is Pt doped with Pd.

* * * * *

UNITED STATES PATENT AND TRADEMARK OFFICE
CERTIFICATE OF CORRECTION

PATENT NO. : 5,693,300
DATED : December 2, 1997
INVENTOR(S) : Ralph J. Sone

It is certified that error appears in the above-identified patent and that said Letters Patent is hereby corrected as shown below:

In Block 56 of the Title page, line 4 of the U.S. Patents, please change "423/253" to --423/235--.

In Block 56 of the Title page, line 1 of the second column, please change "423/253" to --423/235--.

In col. 2, line 32, please change $NO_2$" to --$NO_x$--.

In col. 2, line 59, please insert --of-- after the word "process".

In col. 3, line 19, please change "$NO_2$" to --$NO_x$--.

In col. 4, line 30, please change "Chemical" to --chemical--.

In col. 6, line 6, please change the hyphen "-" to a period --.--.

Signed and Sealed this

Seventeenth Day of March, 1998

Attest:

BRUCE LEHMAN

Attesting Officer          Commissioner of Patents and Trademarks